Feb. 10, 1925.  
V. LINK  
1,525,755  
MEANS FOR RETAINING CYLINDER LINERS  
Filed Oct. 19, 1921
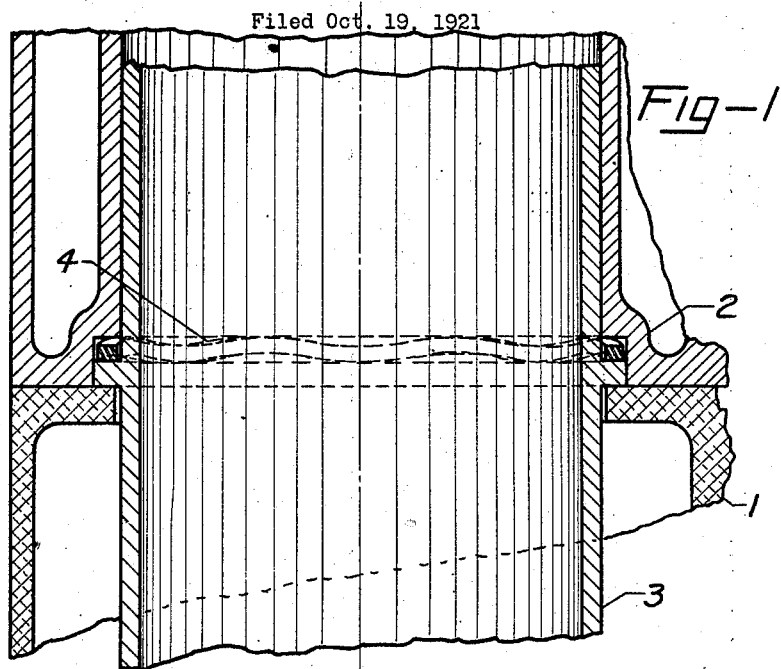
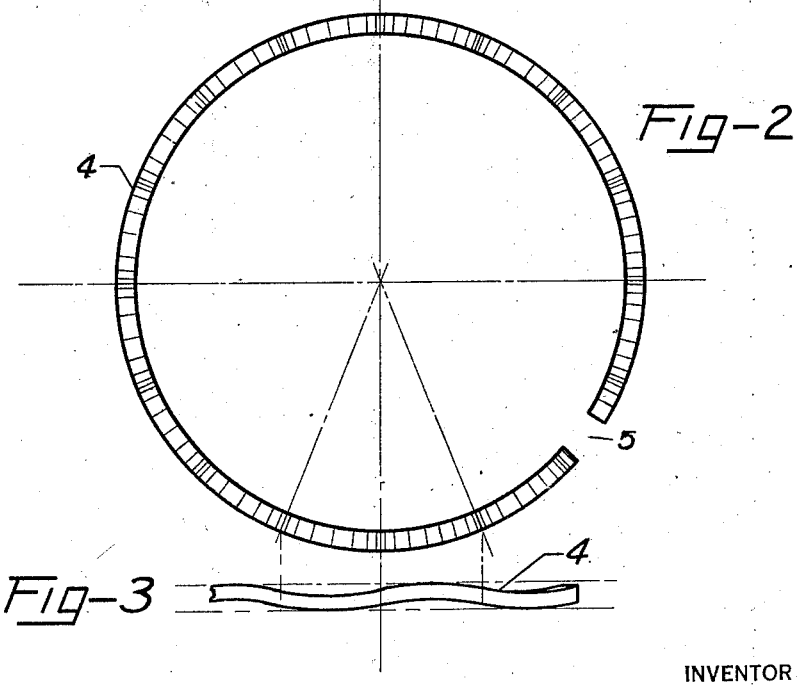
INVENTOR  
VINCENT LINK.  
BY  
William MacHushan  
ATTORNEY Patented Feb. 10, 1925.

1,525,755

UNITED STATES PATENT OFFICE.

VINCENT LINK, OF DETROIT, MICHIGAN, ASSIGNOR TO STUDEBAKER CORPORATION, A CORPORATION OF NEW JERSEY.

MEANS FOR RETAINING CYLINDER LINERS.

Application filed October 19, 1921. Serial No. 508,902.

*To all whom it may concern:*

Be it known that I, VINCENT LINK, a citizen of the United States of America, and resident of Detroit, in the county of Wayne and State of Michigan, have invented certain new and useful Improvements in Means for Retaining Cylinder Liners, of which the following is a specification.

This invention relates to resilient metallic means for securely retaining cylinder liners or the like in cylinders.

This invention has for its object to secure longitudinal retention of cylinder liners, and does not aim to furnish a packing means against joint leakage, but rather only to permit rapid machining of the parts without being forced to use machining limits prohibitively close for modern quantity production. The use of this device allows large machining limits while insuring the absence of relative movement between the parts held. It consists of a corrugated, waved, or meandering metallic spring member placed in such a position that upon assembly with the cylinder liner and parts relationed thereto, it will be compressed and will set up a force tending to securely retain the cylinder liner in position.

A further object is to provide a removable cylinder liner which may readily be placed in position in the cylinder body and when in such position may be held against longitudinal movement by resilient means.

A still further object is to provide a removable cylinder liner having a flange formed thereon which may be inserted in a recess formed in the cylinder body, space being provided between a wall formed by the recess and the flange for the insertion of a resilient metallic spring member to hold the liner against movement relative to the cylinder body and the crank case.

While this device is adaptable to different forms of cylinder liners and to different methods of retaining the same, I have illustrated but one method in the accompanying drawing which shows a preferred embodiment of my present invention in which—

Figure I is a fragmentary sectional view showing the cylinder liner in place and the metallic spring means applied thereto.

Figure II is a plan view of the corrugated or meandering spring member, and

Figure III is a fragmentary side view of the member shown in Figure II.

Referring to the drawings, I have shown a crank case 1 having a flanged portion adapted to receive the cylinder block 2, which may be secured thereto by any suitable means, not shown. A cylinder liner 3 having its upper end extending into an opening formed in the cylinder block is provided with a flange on its outer surface, intermediate its ends, which extends into a recess formed in the cylinder body for a purpose hereinafter described. The recess formed in the cylinder body 2 is of greater width than the flange formed on the cylinder liner 3 to provide space for the insertion of a corrugated or meandering member 4 which, for example, may be in the form of a ring although other forms may be substituted. In the form illustrated, the ring 4 is provided with an opening 5 to allow for increase in circumferential length due to the compression of the ring.

In assembling an engine embodying my invention, the ring 4 may be slipped over the upper end of the cylinder liner 3, after which the cylinder liner 3 is inserted in the cylinder to the point where the ring 4 and flange will be received in a recess formed in the cylinder body. The cylinder body is then bolted, or otherwise secured, to the crank case at which time the flange on the cylinder liner is securely seated on the upper face of the crank case due to the pressure exerted on the corrugated ring when the cylinder and crank case are secured together. Because of the pressure so exerted on the flange of the cylinder liner, the same is securely held in position and longitudinal movement is thereby prevented. As movement of the cylinder liner is prevented the same result is secured as though the flange and recess formed in the cylinder were accurately machined to a given size and dimension and at a much smaller cost.

Formal changes may be made in the specific embodiment of the invention described without departing from the spirit or substance of the broad invention, the scope of which is commensurate with the appended claims.

What I claim is:—

1. In combination with an internal combustion engine, a cylinder liner and a resilient metallic ring for retaining the same against longitudinal movement.

2. In combination with an internal combustion engine, a crank case, a cylinder, a cylinder liner, and a resilient metallic ring between said cylinder and cylinder liner to prevent longitudinal movement of the said cylinder liner.

3. In combination with an internal combustion engine, a crank case, a cylinder, a cylinder liner, and a resilient metallic ring positioned to prevent longitudinal movement of said liner, said ring having corrugations or waves therein.

4. The combination with a flanged member to be held between two clamping members part of whose adjacent faces are to be in contact, of a corrugated metallic spring member placed in a recess between the flange of said flanged member and one of said clamping members.

5. The combination with a member having an encircling flange thereon; two members having adjacent faces in contact and adapted to clamp the flange of said flanged member in a recess therebetween, of a corrugated metallic spring member placed in said recess between one face of one of said clamping members and the adjacent face of said flange, and adapted to be compressed therebetween when said adjacent faces of said clamping members are brought into contact.

6. The combination with a member having a flange thereon; a member having a joining surface and a recess therein adapted to receive said flange; another member having a joining surface adapted to register and to be in contact with the first mentioned joining surface; of a corrugated member of spring metal adapted to be placed in said recess between the flange of said flanged member and one of the other said members and adapted to be compressed when said joining surfaces are brought into contact; and means for compensating for the changed length of said corrugated member due to compression.

7. In combination with an internal combustion engine, a crank case, a cylinder, a cylinder liner, and resilient metallic retaining means interposed between said cylinder and said cylinder liner to prevent longitudinal movement of said cylinder liner.

8. In combination with an internal combustion engine, a crank case, a cylinder, a cylinder liner, a flange on said cylinder liner, and resilient metallic means interposed between said cylinder and the flange on said cylinder liner to prevent movement of said cylinder liner.

9. In combination with an internal combustion engine, a crank case, a cylinder, a recess formed in the inner surface of said cylinder, a cylinder liner, a flange on said cylinder liner adapted to lie in the recess formed in said cylinder, and resilient metallic means interposed between said flange and the wall formed by said recess to prevent movement of said cylinder liner relative to said cylinder.

10. In an internal combustion engine, a crank case, a cylinder, a removable cylinder liner having a portion of its length engaging the walls of the cylinder and the remainder of its length extending into and supported by the crank case, and resilient metallic means interposed between said cylinder liner and said cylinder to prevent relative movement thereof.

11. In an internal combustion engine, a crank case, a cylinder, a removable one-piece cylinder liner having a portion of its length extending into said cylinder, and resilient metallic means interposed between said cylinder and said liner to rigidly hold said liner in position against said crank case.

12. In an internal combustion engine, a crank case, a cylinder, a recess formed in said cylinder, a removable one-piece cylinder liner having a portion of its length extending into said cylinder, a flange on said cylinder liner adapted to lie in the recess formed in said cylinder, and resilient metallic means interposed between said liner in position against said crank case.

Signed by me at Detroit, Michigan, this 17th day of October, 1921.

VINCENT LINK.

Witnesses:
ELMER L. McINTYRE,
HODGSON S. PIERCE.